Patented Jan. 20, 1942

2,270,503

UNITED STATES PATENT OFFICE 2,270,503

GEL-TYPE METAL OXIDE CATALYST

Robert E. Burk and Everett C. Hughes, Cleveland, Ohio, assignors to The Standard Oil Company, Cleveland, Ohio, a corporation of Ohio No Drawing. Application September 1, 1938, Serial No. 228,005

13 Claims. (Cl. 252—232)

This invention relates to catalysis, and more particularly catalysis involving operation on organic materials, as alcohols, hydrocarbons, etc.; and among the objects of the invention is the provision of effective and durable catalysts.

Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The raw material applicable for reaction may be alcohols, non-benzenoid hydrocarbons, or fractions containing them, etc., and is subjected to the action of a compound catalyst of peculiar character, and heat. In our work in oxide catalytic agents we have found that a combination of elements described hereinafter gives surprising results, and which are out of relation to the behavior of the individual components or other combinations. This catalyst may be prepared preferably from soluble salts of tin, aluminum and chromium for example by dissolving the salts in water at the rate of two mol per cent of tin, seventy-eight mol per cent of aluminum and twenty mol per cent of chromium, and the solution is treated with ammonia to neutralization. Thus, tin chloride and aluminum nitrate and chromium nitrate at the rate of 78.2, 2500 and 713 G. respectively, based on anhydrous salts, per 18.8 liters of distilled water, being brought into solution, the solution is warmed to about 55° C., and being introduced into a container provided with an agitator, concentrated ammonium hydroxide 2310 G. and 1500 G. ammonium acetate per 11.2 liters of distilled water is supplied. A blue-green precipitate is formed which is allowed to settle for about two hours, and the cake resulting is washed three times by dispersion into four liters of water, and is filtered. The precipitate is dried at about 140° F., and then under vacuum at about 400° F. A vitreous gel results. The proportions of tin and aluminum and chromium are most desirably those as above-indicated, but in general the tin need not advisably be less than one or more than thirty metal atom per cent and the aluminum not less than fifty nor more than ninety metal atom per cent, the remainder being chromium. In some instances antimony may replace all or part of the tin. Again in some instances beryllium may replace all or part of the aluminum. That is, an element from the group of laterally adjacent atomic numbers 50 and 51 in the periodic table and an amphoteric oxide forming element from the diagonally adjacent atomic numbers 4 and 13 in the periodic table and chromium may be combined. Thus, antimony chloride and aluminum nitrate and chromium nitrate at the rate of 68.4, 2500 and 713 G. respectively per 18.8 liters of distilled water, being brought into solution, the solution is warmed and with vigorous agitation ammonium hydroxide is introduced at the rate of 2310 G. of concentrated ammonium hydroxide with 1500 G. of ammonium acetate per 11.2 liters of distilled water. Again similarly, SnCl4 and Be(NO3)2 and Cr(NO3)3 may be dissolved at the rate of 78.2, 1550 and 713 G. respectively per 18.8 liters of distilled water, and the solution being warmed and agitated ammonium hydroxide is introduced at the rate of 1820 G. of concentrated (28%) ammonium hydroxide and ammonium acetate 1500 G. in 11.2 liters of distilled water.

Where a part of the tin or aluminum is replaced by antimony or beryllium respectively, the catalyst involves tin and antimony and aluminum and chromium, or beryllium and aluminum and tin and chromium, or beryllium and aluminum and tin and antimony and chromium, etc., on the lines as indicated and within the proportions stated for the permissible ranges of the tin and aluminum components, the generic properties of the catalyst being maintained.

For operation, the compound catalyst is suitably granulated to provide interstitial spaces for passage of the material to be treated, in adequate contact, and is arranged in a reaction zone with adequate heating means, such that the temperature of the mass may be maintained around 500° C. most desirably, or at least in general not under about 375° or over about 675° C., the raw material being passed into contact with the catalyst. The pressure may be atmospheric to not in excess of about two hundred pounds per square inch, preferably a nominal pressure. The raw material, for illustration hydrocarbons normally gaseous such as ethane to pentane, pure hydrocarbons such as n-hexane, n-heptane, n-octane, etc., naphthas or distillates from stocks which are predominantly non-benzenoid, as for instance derived from Pennsylvania, Michigan, Kentucky, Ohio, Mid-Continent and the like petroleum, (for example Pennsylvania or Michigan naphthas in boiling range 60 to 215° C.), naphthenic naphtha, etc. is thus brought into contact with the catalyst, and the rate of feed or space-velocity depends somewhat upon the operating temperature and for instance in terms of liters of liquid per liter of catalyst may be 0.1 or up to 10. The products may be re-passed in whole or part, where desired. The aromatics and/or unsaturates in the products passing from the treating zone may be separated, e. g. by mixing with a solvent having the selective character of sulphur dioxide, or a high boiling amine, 0.75–3 or somewhat more volumes being employed, and the portion of the products not dissolved by the solvent may, on separation, be re-passed through the catalytic zone.

Other modes of applying the principle of the invention may be employed, change being made as regards the details described, provided the features stated in any of the following claims, or the equivalent of such, be employed.

We therefore particularly point out and distinctly claim as our invention:

1. A process of preparing a gel type oxide, catalyst, which comprises mixing tin chloride and aluminum nitrate in proportions for two metal atom per cent and seventy-eight metal atom per cent with twenty metal atom per cent of chromium as nitrate, in solution, warming, incorporating ammonium hydroxide sufficient for precipitation and stirring, allowing the precipitate and liquid to stand several hours, washing the precipitate and filtering, drying the precipitate at about 140° F., and finally drying under vacuum at about 400° F.

2. A process of preparing a gel type oxide catalyst, which comprises mixing antimony chloride and aluminum nitrate and chromium nitrate in relative amounts of 68.4, 2500 and 713 parts by weight each, in solution, warming, and co-precipitating by ammonium hydroxide, washing the precipitate, filtering, and finally drying the precipitate.

3. A process of preparing a gel type oxide catalyst, which comprises mixing tin chloride and aluminum nitrate with chromium nitrate, in solution, in which the tin in the tin salt makes up from one to thirty metal atom per cent of the dissolved salts, forming a gel type plural oxide co-precipitate from such solution by adding ammonium hydroxide, and washing, filtering and drying the precipitate.

4. A process of preparing a gel type oxide catalyst, which comprises co-precipitating gel type plural oxides by adding ammonium hydroxide to a solution containing dissolved salts of tin, aluminum and chromium, in which the tin in the tin salt makes up from one to thirty metal atom per cent of the dissolved salts, washing, filtering, and drying the precipitate.

5. A process of preparing a gel type oxide catalyst, which comprises co-precipitating gel type plural oxides by adding ammonium hydroxide to a solution containing dissolved salts of antimony, aluminum and chromium, in which the aluminum in the aluminum salt makes up fifty to ninety metal atom per cent of the dissolved salts, washing, filtering, and drying the precipitate.

6. A process of preparing a gel type oxide catalyst, which comprises co-precipitating gel type plural oxides by adding ammonium hydroxide to a solution containing dissolved salts of tin, beryllium and chromium, in which the tin in the tin salts makes up one to thirty metal atom per cent of the dissolved salts, washing, filtering, and drying the precipitate.

7. A process of preparing a gel type oxide catalyst, which comprises co-precipitating gel type plural oxides by adding ammonium hydroxide to a solution containing dissolved salts including antimony, beryllium and chromium, washing filtering, and finally drying the precipitate.

8. A process of preparing a gel type oxide catalyst, which comprises co-precipitating gel type plural oxides by mixing an operative basic precipitant with a solution containing dissolved salts of chromium and an amphoteric oxide forming salt from the group consisting of beryllium and aluminum salts and an acid oxide forming salt from the group consisting of tin and antimony salts, the acid oxide forming salt making up one to thirty metal atom per cent and the amphoteric oxide forming salt fifty to ninety metal atom per cent of the dissolved salts, and washing and drying the precipitate.

9. A plural oxide gel catalyst consisting of the washed and dried oxides co-precipitated by an operative soluble precipitant from a solution containing tin chloride and aluminum nitrate and chromium nitrate in proportions of substantially two and seventy-eight and twenty metal atom per cent respectively.

10. A plural oxide gel catalyst consisting of the washed and dried oxides co-precipitated by an operative soluble precipitant from a solution containing dissolved salts of tin and aluminum and chromium, in which the tin in the tin salt makes up one to thirty metal atom per cent of the dissolved salts.

11. A plural oxide gel catalyst consisting of the washed and dried oxides co-precipitated by an operative soluble precipitant from a solution containing dissolved salts of antimony and aluminum and chromium, in which the antimony in the antimony salt makes up one to thirty metal atom per cent of the dissolved salts.

12. A plural oxide gel catalyst consisting of the washed and dried oxides co-precipitated by an operative soluble precipitant from a solution of salts of tin and beryllium and chromium, in which the tin in the tin salt makes up one to thirty metal atom per cent of the dissolved salts.

13. A plural oxide gel catalyst consisting of the washed and dried oxide co-precipitated by an operative soluble precipitant from a solution of salts of chromium and an amphoteric oxide forming element from the group consisting of beryllium and aluminum and an acid oxide forming element from the group consisting of tin and antimony, such acid oxide forming element in the catalyst being one to thirty metal atom per cent, and such amphoteric oxide forming element fifty to ninety metal atom per cent.

ROBERT E. BURK.
EVERETT C. HUGHES.